July 25, 1950           A. P. DINSMORE          2,516,189
PRECISION AIRCRAFT TACHOMETER
Filed Jan. 24, 1946
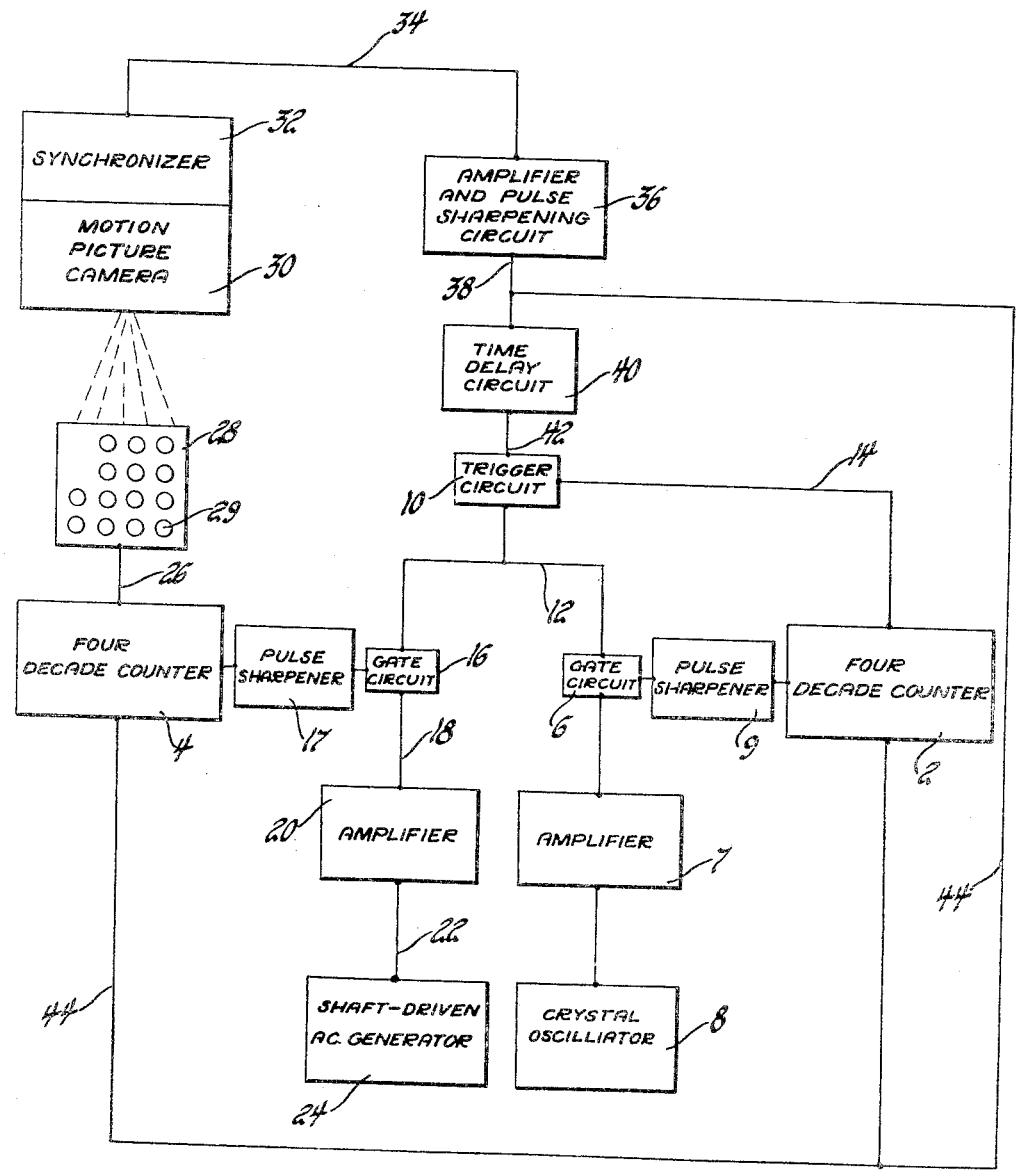
Inventor
Albert P. Dinsmore
By Blackmore, Spencer & Flint
Attorneys Patented July 25, 1950

2,516,189

UNITED STATES PATENT OFFICE 2,516,189

PRECISION AIRCRAFT TACHOMETER

Albert P. Dinsmore, Dayton, Ohio, assignor to General Motors Corporation, Detroit, Mich., a corporation of Delaware Application January 24, 1946, Serial No. 643,155

11 Claims. (Cl. 346—14)

This invention relates to indicating and recording means and more particularly means for indicating and recording operating characteristics of rotating mechanisms which characteristics may change rapidly from time to time. As illustrative of an application for the equipment covered by this invention but in no way in a limiting sense is that in which mechanisms under test vary in rotational speed, such as in the case of engines or motors, the revolutions per minute of the shaft may be caused to vary considerably and rapidly. In functional tests on aircraft engines, an accurate determination of the R. P. M. of an engine is important at the instant when other data is taken in order to determine, for example the interrelation of causitive factors with resultant changes in R. P. M. Since the speeds of these engines change rapidly, ordinary tachometer means which is conventionally known is not capable of following these rapid changes accurately inasmuch as there is inertia involved in the indicating mechanism and as a result there is a delay of a finite time interval in the response of this indicating mechanism, so that the reading on a conventional tachometer is actually not representative of the true speed at a given instant in operation, and due to this factor it is impossible with conventional equipment to obtain accurate indications of changing speeds.

In these tests on actual operation of aircraft it is customary to mount in the plane a photoobserver unit which is comprised of motion picture camera means focused on a panel on which are mounted instruments which identify various conditions existing in the operation of the plane. The plane is then flown through certain test maneuvers or test conditions and the camera continuously records the readings on the meters and indicators. The film is then developed and when projected, observers can study and deliberate upon the conditions of operation which existed during the short interval of the test condition. Since rapid changes of engine R. P. M. may occur very suddenly it is necessary to provide some means for determining shaft R. P. M. which is substantially without inertia and will therefore quickly and instantaneously respond to a change in R. P. M.

It is therefore an object of my invention to provide a substantially inertialess means for determining operating characteristics of a mechanism.

It is a further object of my invention to provide an inertialess tachometer.

It is a still further object of my invention to provide a tachometer capable of determining shaft R. P. M. in very short time intervals and provide an indication which may be photographically recorded.

With these and other objects in view which will become apparent as the specification proceeds, my invention will be best understood by reference to the following specification and claims and the illustrations in the accompanying drawings, in which:

The figure is a schematic or block diagram showing the various instrumentalities comprising the system of my invention and their connections.

As previously mentioned, in the flight testing of aircraft a motion picture camera is frequently used to record the readings of the various instruments while the plane is being flown and the photographic record or film is later readily projected and studied. Therefore, each time a frame is exposed and a record made it will be necessary for the means indicating the engine R. P. M. to be positioned at some reading and not be in any transitional stage so that confusion as to its reading might result. In motion picture cameras, the shutter uncovers the film aperture and permits the scene to be projected on the film for a short interval of time and then closing, this process being repeated at a definite rate, in the present instance this rate is approximately 8 frames or exposures per second and at each instant when the exposure is made the indicating means must read a definite speed. During the times when the camera shutter prevents exposure the speed determining means must be operative to determine the engine R. P. M. and the indication means must be in the transitional stage and then assume a position or condition indicating the R. P. M. which may then be photographed. In general, the R. P. M. determining means is controlled in this instance by the camera shutter and is in operation only during the time that the camera shutter is closed between exposures.

The problem of measuring engine R. P. M. is one of frequency determination. As is used in other fields a number of cycles of the frequency may be counted over a definite time period to give this measurement. Therefore, the first essential of a measuring means is to provide a definite time interval within which a count of the unknown frequency is to be made, secondly to provide a frequency proportional to the speed of the shaft or body which it is desired to measure and lastly to provide means to count and tally the cycles of this unknown frequency occurring during the definite time interval established. In the present instance two so-called "decade" counters are provided which are capable of counting cycles, the first to provide the time interval, the second to count cycles of the frequency proportional to the R. P. M. of the shaft. As shown in the figure, decade counter 2 is provided to give the definite or fixed time interval and decade counter 4 is the one responsive to engine speed. These decade counters are composed of Eccles-Jordon "trigger" stages and per se form no part of the present invention and will be described in more detail at a later point in the specification, however, it may be said at this time that these are accurate and rapid calculators electronically operated in which there is substantially no inertia or time delay.

The decade counter 2 is controlled in its operation by a gate circuit 6 which alternately passes and blocks the signal frequency supplied thereto. This gate circuit is located between the counter and a fixed crystal oscillator 8 the latter for supplying a fixed frequency. The gate circuit 6 therefore controls the flow of the signal frequency from the oscillator 8 through amplifier 7 and pulse sharpener 9 to the decade counter 2. The gate circuit is in turn controlled by a flip-flop trigger circuit 10. Thus, when the trigger circuit permits the gate circuit to open, cycles from the fixed frequency oscillator will be counted by the decade counter 2. A conductive line 12 connects the trigger circuit with the gate circuit. A conductor 14 connects the output of the decade counter 2 with the trigger circuit in such a manner that after a predetermined number of cycles have been counted by the decade counter a signal is sent back to the trigger circuit, which in turn deactivates the gate circuit to stop any further counting. In other words, this portion of the system permits the counting of a predetermined number of impulses to provide a definite predetermined time interval and then stops.

The second portion of this system which involves decade counter 4 is likewise provided with a gate circuit 16 which determines the conductive or counting periods of the counter 4. The gate circuit is connected directly through line 18 with an amplifier circuit 20 which in turn receives its signal through line 22 from a shaft driven A. C. generator 24. Thus, a generator driven at engine speed provides an A. C. signal frequency to an amplifier circuit which again feeds this amplified signal through the gate circuit 16 and pulse sharpener 17 to the decade counter 4. As previously, the trigger circuit 10 through the conductive line 12 controls the gate circuit 16 to determine the interval during which the signal frequency may feed through to the counter 4. The counter 4 is provided with a conductive line 26 which is connected to an indicator 28 which is applied to the observer unit instrument panel which is to be photographed and consists of a series of glow lamps 29 energized in sequence series by the counter 4 to give an indication of the speed of the engine.

All of the means so far described must be energized and make the frequency determination within the time when the motion picture camera is not exposing film and it is therefore necessary that the system be controlled by said camera which is shown in the system at 30. As the shutter closes the means must immediately be set in operation so that the frequency determination can be made and the indicator action stopped prior to the reopening of the shutter. Synchronizing is accomplished by means on the motion picture camera itself which may be termed here the synchronizer 32 and is the subject matter of a co-pending application which matured into Patent No. 2,427,125, dated September 9, 1947, but it may suffice it here to say that when the shutter closes a pulse is generated and transmitted over line 34 to an amplifier system 36, the output of the amplifier being fed through line 38 to a time delay circuit 40 which feeds directly through line 42 into the trigger circuit and is provided to prevent triggering the flip-flop circuit 10 prior to resetting the decade counters. A conductive line 44 connects both decade counters with line 38 and is provided to conduct an amplified pulse from the synchronizer to reset the decade counters at the beginning of each counting interval.

Let us assume for the moment that our crystal oscillator is capable of generating 100,000 cycles per second, and our time interval is equal to the time required for the counter 2 to pass 6000 cycles of this frequency, then our time interval will be .06 second which is fixed and which is sufficiently short that it may easily be synchronized to transpire during the time the shutter of the camera is closed. In order to make a satisfactorily accurate frequency determination within this relatively short time we must step up or multiply the engine R. P. M. considerably for this purpose. Let us assume also therefore that the engine driven generator 24 is so designed as to supply a frequency to the second decade counter 4 of exactly 1000 times engine R. P. M. This of course may be accomplished by any suitable means such as gearing. The precise generator itself also forms the subject matter of a copending application, S. N. 645,922 entitled Signal Generator, filed February 6, 1946, in the names of Paul Morgan, Howard Geyer, and Albert P. Dinsmore, now abandoned, and therefore will not be dealt with specifically. Suffice it to say at this point that the generator does provide a signal frequency at 1000 times engine R. P. M.

In general therefore the operation is as follows. Let us assume that the camera shutter in its cycle has just closed then at this instant a pulse from the synchronizer 32 is admitted through line 34 to the amplifier 36 which through the time delay circuit 40 and the trigger circuit 10 permits both the electronic gates 16 and 6 to conduct. The crystal oscillator signal therefore is admitted to the decade counter 2 and the signal from the shaft driven generator 24, is admitted to the decade counter 4, and these signal frequencies continue to be counted by their respective counters until the decade counter 2 sends its final signal at the end of 6000 cycles back to the trigger circuit 10 through line 14. This immediately closes the gate circuits 6 and 16 and the decade counters 2 and 4 are blocked—but the number of cycles that counter 4 has received during this time interval of .06 second is registered on the indicator 28. At the end of this counting interval the motion picture camera shutter is about to open to make the next exposure and does so with an accurate count of the engine driven generator frequency now appearing on the indicator 28 and the same therefore is photographed by the camera. Since we assumed the time interval of .06 second or .001 minute, and the counted frequency was assumed to be made equal to exactly 1000 times shaft R. P. M., then the count over this time interval is equal to the shaft speed in R. P. M. The shutter again closes after the exposure and a synchronizing pulse is provided to amplifier 36 and through line 38 to the time delay circuit. However, through the direct line 44 a pulse resets both decade counter 2 and decade counter 4 during a delay in the time delay circuit of a few milliseconds and prior to the trigger circuit again opening the two gate circuits 6 and 16. This procedure is of course repeated throughout the operation of the device and therefore continuously provides an inertialess indication of shaft speed at all times.

I claim:

1. In indicating apparatus, a source of constant frequency current, a second source of current whose frequency is determined by the operation of a mechanism being tested, a plurality of counting means responsive to frequency, one being connected to each source of current, means to control the flow of current from each source to its associated counting means, timed switching means for commonly controlling the operation of the control means and conductive means connecting the counting means actuated by the constant frequency current source to the switching means to actuate the latter.

2. In indicating means, a pair of sources of alternating current, one of a constant frequency and one of a frequency dependent upon movement of an operating part being tested, a pair of counting means one connected to and responsive to the frequency of one of the sources and the other to the second source, indicating means connected to the counting means responsive to the variable frequency source and switching means to control the counting means connected to the variable frequency source connected to the counting means responsive to the constant frequency to control the energization of the first named counting means.

3. In indicating means, a pair of sources of alternating current, one of a constant frequency and one of a frequency dependent upon the speed of a part to be tested, a counter connected to each source to be actuated by the pulses generated, an indicating panel connected to the output of the counter responsive to the variable frequency and timed switching means to commonly control the active periods of both counters connected to the output of the constant frequency counter.

4. In indicating means, an alternating current generator whose frequency is proportional to the speed of a part to be tested, counter means connected to the generator to be actuated by the pulses thereof, a visual indicator connected to the counter to be operated thereby to give a reading, recording means, and synchronized timed control means for the visual means actuated by the recording means to synchronize the operation of the recording means and the visual indicator means and periodically actuate the latter means to produce a permanent record of the indications appearing on the indicating means.

5. In indicating means, a source of alternating current whose frequency is proportional to the movement of a part to be tested, counting means connected to the source, a source of constant frequency current, a second counting means connected to said constant frequency source, switching means for commonly controlling the energization of both counting means and conductive means connecting the output of the counter for the constant frequency to the switching means to actuate the same.

6. In indicating means, a source of alternating current whose frequency is proportional to the movement of a part to be tested, counting means connected to the source, a source of constant frequency current, a second counting means connected to said constant frequency source, switching means for commonly controlling the energization of both counting means, visual indicating means connected to the counter energized by the variable frequency to indicate the number of pulses received, recording means, synchronized timed control means actuated by the recording means connected to the switching means, to periodically initiate operation of counter means to make a series of permanent records of the indications of the indicating means and conductive means connecting said switching means to the output of the second counter to control the active periods of the counters from the second counter.

7. In indicating means, a source of alternating current whose frequency is proportional to the movement of a part to be tested, counting means connected to the source, a source of constant frequency current, a second counting means connected to said constant frequency source, switching means for commonly controlling the energization of both counting means, visual indicating means connected to the counter energized by the variable frequency to indicate the number of pulses received, recording means periodically operated to make a series of permanent records of the indications of the indicating means, synchronizing means actuated by said recording means and connected to said switching means to operate the same and conductive means interconnecting the output of the second counter with the switching means so that the signal received by the switching means places the latter in condition to deenergize the counters while the signal from the synchronizing means reverses the condition so that the counters are activated.

8. In indicating means, a source of alternating current whose frequency is proportional to the movement of a part to be tested, counting means connected to the source, a source of constant frequency current, a second counting means connected to said constant frequency source, switching means for commonly controlling the energization of both counting means, visual indicating means connected to the counter energized by the variable frequency to indicate the number of pulses received, recording means periodically operated to make a series of permanent records of the indications of the indicating means, synchronizing means actuated by said recording means and connected to both the switching means and to the counters, delay means in the connection between the synchronizing means and the switching means so that the signal from the synchronizing means will reach the counters to reset the same prior to the actuation of the switching means.

9. In indicating and recording means an alternating current generator driven by a shaft whose speed it is desired to record, a counter connected thereto to count the impulses generated thereby, a constant frequency oscillator, a second counter connected thereto, common switching means for controlling the flow of current to the counters, a visual indicator connected to the first counter to indicate the number of pulses received thereby, a motion picture camera having a rotating shutter focused upon said indicator and synchronizing means actuated by said shutter, connected to actuate said common switching means as the shutter prevents exposure to initiate the calculation by the counters at a time when no exposure is taking place.

10. In indicating and recording means an alternating current generator driven by a shaft whose speed it is desired to record, a counter connected thereto to count the impulses generated thereby, a constant frequency oscillator, a second counter connected thereto, common switching means for controlling the flow of current to the counters, a feed back connection from the output of the second counter to the switching means to cause actuation of the same after a definite number of pulses have been received by the counter to deenergize both counters, a visual indicator connected to the first counter to indicate the number of pulses received thereby, a motion picture camera focused on said indicator having a shutter, synchronizing means operated by said shutter and connected to the common switching means to actuate the same and energize the counters at such times as the shutter is closed and no exposure is made.

11. In indicating and recording means an alternating current generator driven by a shaft whose speed it is desired to record, a counter connected thereto to count the impulses generated thereby, a constant frequency oscillator, a second counter connected thereto, common switching means for controlling the flow of current to the counters, a feed back connection from the output of the second counter to the switching means to cause actuation of the same after a definite number of pulses have been received by the counter to deenergize both counters, a visual indicator connected to the first counter to indicate the number of pulses received thereby, a motion picture camera focused on said indicator having a shutter, synchronizing means operated by said shutter and connected to the common switching means to actuate the same and energize the counters at such times as the shutter is closed and no exposure is made, time delay means between the synchronizing means and the common switching means to delay the arrival of the signal at the latter and conductive means connecting the synchronizing means directly with the counting means to reset the same before the signal reaches the switching means.

ALBERT P. DINSMORE.

REFERENCES CITED

The following references are of record in the file of this patent:

UNITED STATES PATENTS

| Number | Name | Date |
| --- | --- | --- |
| 815,778 | Anderson | Mar. 20, 1906 |